US 8,645,952 B2

(12) United States Patent
Biswas et al.

(10) Patent No.: US 8,645,952 B2
(45) Date of Patent: *Feb. 4, 2014

(54) METHOD FOR PROVIDING LOCATION INDEPENDENT DYNAMIC PORT MIRRORING ON DISTRIBUTED VIRTUAL SWITCHES

(75) Inventors: Amitabha Biswas, San Francisco, CA (US); John I. Buswell, Athens, OH (US); Jayakrishna Kidambi, San Jose, CA (US); Harshad S. Padhye, Santa Clara, CA (US); Vijoy Pandey, San Jose, CA (US); Dorit Rond, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,445

(22) Filed: Aug. 14, 2012

(65) Prior Publication Data

US 2012/0307684 A1 Dec. 6, 2012

Related U.S. Application Data

(63) Continuation of application No. 13/107,903, filed on May 14, 2011.

(51) Int. Cl.
*G06F 9/46* (2006.01)
*G06F 9/455* (2006.01)

(52) U.S. Cl.
USPC .............................................. 718/1; 718/102

(58) Field of Classification Search
None
See application file for complete search history.

(56) References Cited

U.S. PATENT DOCUMENTS

| 7,836,332 | B2* | 11/2010 | Hara et al. | 714/5.11 |
|---|---|---|---|---|
| 8,037,344 | B2* | 10/2011 | Hara et al. | 714/5.1 |
| 8,195,774 | B2* | 6/2012 | Lambeth et al. | 709/220 |
| 2009/0025007 | A1* | 1/2009 | Hara et al. | 718/105 |
| 2010/0214949 | A1* | 8/2010 | Smith et al. | 370/254 |
| 2011/0255538 | A1* | 10/2011 | Srinivasan et al. | 370/392 |
| 2012/0291026 | A1* | 11/2012 | Biswas et al. | 718/1 |

FOREIGN PATENT DOCUMENTS

| CN | 101075920 A | 11/2007 |
|---|---|---|
| CN | 101156408 A | 4/2008 |
| CN | 101667966 A | 3/2010 |

OTHER PUBLICATIONS

"Port mirroring" Wikipedia, the free encyclopedia, Mar. 24, 2010.*
International Search Authority; PCT/IB2012/051950; International Search Report dated Sep. 13, 2012 (8 pg).

* cited by examiner

*Primary Examiner* — Meng An
*Assistant Examiner* — Bradley Teets
(74) *Attorney, Agent, or Firm* — Yudell Isidore Ng Russell PLLC

(57) ABSTRACT

A method for providing location independent dynamic port mirroring on distributed virtual switches is disclosed. A controller is provided to configure one or more virtual switches within a group of physical machines to appear as a set of distributed virtual switches. In response to the receipt of a data packet at a port of a physical machine, a determination is made whether or not the port has a monitor port located on the physical machine. If the port has a monitor port located on the same physical machine, a copy of the data packet is sent to the monitor port of the physical machine. If the port has a monitor port located on a different physical machine, a copy of the data packet along with an identification (ID) of the port and an ID of the monitor port are encapsulated, and the encapsulated information are sent to a controller.

3 Claims, 5 Drawing Sheets

METHOD FOR PROVIDING LOCATION INDEPENDENT DYNAMIC PORT MIRRORING ON DISTRIBUTED VIRTUAL SWITCHES

The present application is a continuation of U.S. patent application Ser. No. 13/107,903, filed May 14, 2011, and entitled "METHOD FOR PROVIDING LOCATION INDEPENDENT DYNAMIC PORT MIRRORING ON DISTRIBUTED VIRTUAL SWITCHES", the disclosure of which is hereby incorporated herein by reference in its entirety for all purposes.

BACKGROUND OF THE INVENTION

1. Technical Field

The present disclosure relates to server virtualizations in general, and in particular to distributed virtual switches. More particularly, the present disclosure relates to a method for providing location independent dynamic port mirroring on distributed virtual switches.

2. Description of Related Art

Generally speaking, server virtualization describes a software abstraction that separates a physical resource and its use from the underlying physical machine. Most physical resources, such as processors, storage devices, and network adaptors, can be abstracted and provisioned as virtualized entities.

Virtual machines (VMs) play a central role in server virtualization. A VM is a virtualization of a physical machine and its hardware components. A VM typically includes a virtual processor, a virtual system memory, and various virtual devices. A single physical machine can host multiple VMs. Guest operating systems can be executed on VMs and function as though executing on actual hardware of a physical machine.

A hypervisor or virtual machine manager provides an interface between VMs and the underlying hardware of a physical machine. By multiplexing all accesses to the underlying hardware among various VMs, a hypervisor guarantees various VM the usage of the actual hardware, such as processors, system memory, etc., of the physical machine.

A typical server virtualization implementation generally requires multiple VMs to share a network adapter or network interface card (NIC) of a physical machine for performing external network input/output operations. A hypervisor typically provides a virtual switch (vswitch) that provides interconnectivity among the VMs on the physical machine. With each VM having one or more virtual NICs (vNICs), the vswitch interfaces between the NIC of the physical machine and the vNICs of the associated VMs. In general, each vNIC operates like a physical NIC, being assigned a media access control (MAC) address that is typically different from that of the physical NIC. The vswitch performs the routing of packets between the various vNICs and the physical NIC.

The present disclosure provides an improved method for providing port mirroring on distributed vswitches.

SUMMARY OF THE INVENTION

In accordance with a preferred embodiment of the present disclosure, a controller is provided to configure one or more virtual switches within a group of physical machines to appear as a set of distributed virtual switches. In response to the receipt of a data packet at a port of a physical machine, a determination is made whether or not the port has a monitor port located on the physical machine. If the port has a monitor port located on the same physical machine, a copy of the data packet is sent to the monitor port of the physical machine. If the port has a monitor port located on a different physical machine, a copy of the data packet along with an identification (ID) of the port and an ID of the monitor port are encapsulated, and the encapsulated information are sent to a controller.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
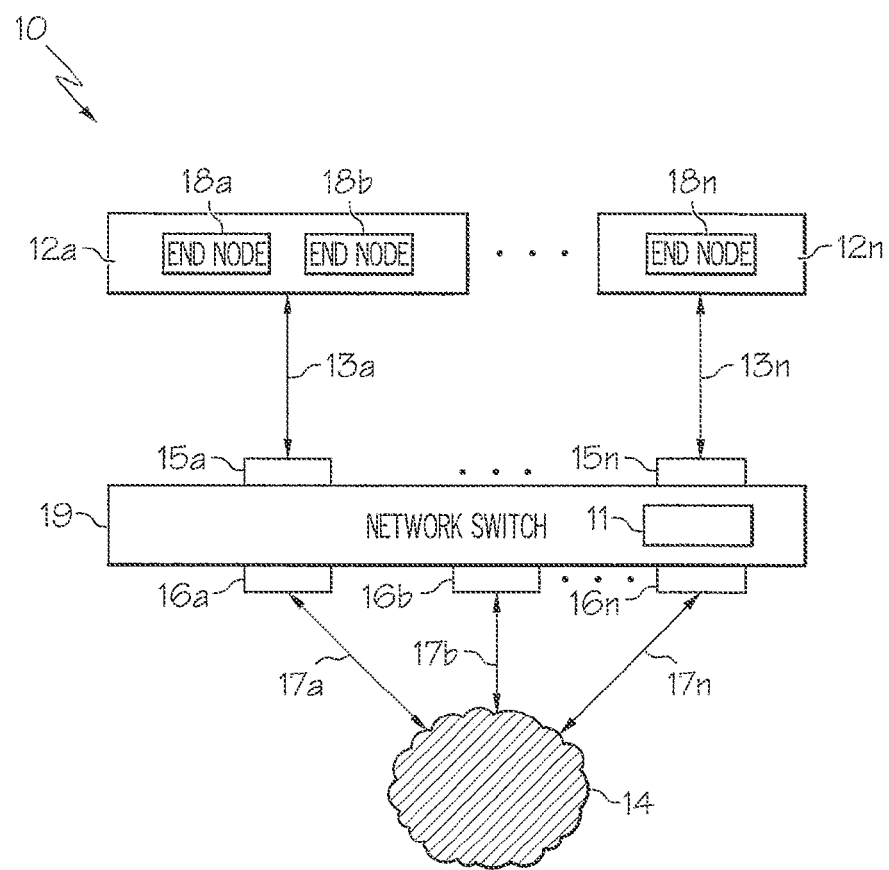
FIG. 1 is a block diagram of a data center having multiple physical machines in which a preferred embodiment of the present invention can be implemented.

Referring now to the drawings and in particular to FIG. 1, there is depicted a block diagram of a data center having multiple physical machines in which a preferred embodiment of the present invention can be implemented. As shown, a data center 10 includes multiple physical machines 12a-12n in communication with a network 14 through a network switch 19. Network 14 can be a local-area network (LAN), a wide-area network (WAN), or a metropolitan-area network (MAN). The equipment of data center 10 can reside together locally at a single site or distributed over separate sites.

Each of physical machines 12a-12n may include hardware such as processors, memories, input/output (I/O) devices, network interface cards (NICs) or converged network adapters (CNAs), etc. Physical machines 12a-12n can reside alone or be stacked together within a chassis such as in a rack server or in a blade server, and network switch 19 can reside alone or be stacked within the same chassis as one or more of physical machines 12a-12n.

Each of physical machines 12a-12n may host one or more end-nodes. In FIG. 1, physical machine 12a is shown to host two end-nodes 18a and 18b, and physical machine 12n is shown to host one end-node 18n. End-nodes 18a-18n can be physical or virtual. Examples of end-nodes 18a-18b include, but are not limited to, application programs, operating systems, virtual machines, hypervisors, virtual and physical NICs, virtual and physical NIC queues, and virtual and physical storage devices. Types of end-nodes 18a-18b include, but are not limited to, network end-nodes and storage end-nodes. Network end-nodes process network data packets, and storage end-nodes process storage data packets. Physical and virtual end-nodes that perform data networking are called physical and virtual network end-nodes, respectively, whereas physical and virtual end-nodes that perform storage networking are called physical and virtual storage end-nodes, respectively.

Network switch 19 includes multiple physical downlink ports 15a-15n and multiple physical uplink ports 16a-16n. Network switch 19 performs switching of data packets between physical downlink ports 15a-15n and physical uplink ports 16a-16n. Each of physical machines 12a-12n is directly connected to one of physical downlink ports 15a-15n via a corresponding one of physical links 13a-13n. Physical uplink ports 16a-16n serve to connect network switch 19 to network 14 via physical uplinks 17a-17n.

Network switch 19 may include a management module 11 by which network switch 19 is configured to perform switching of data packets based on virtual ports (v-ports). An Ethernet switch is an exemplary implementation of network switch 19.

Figure 2:
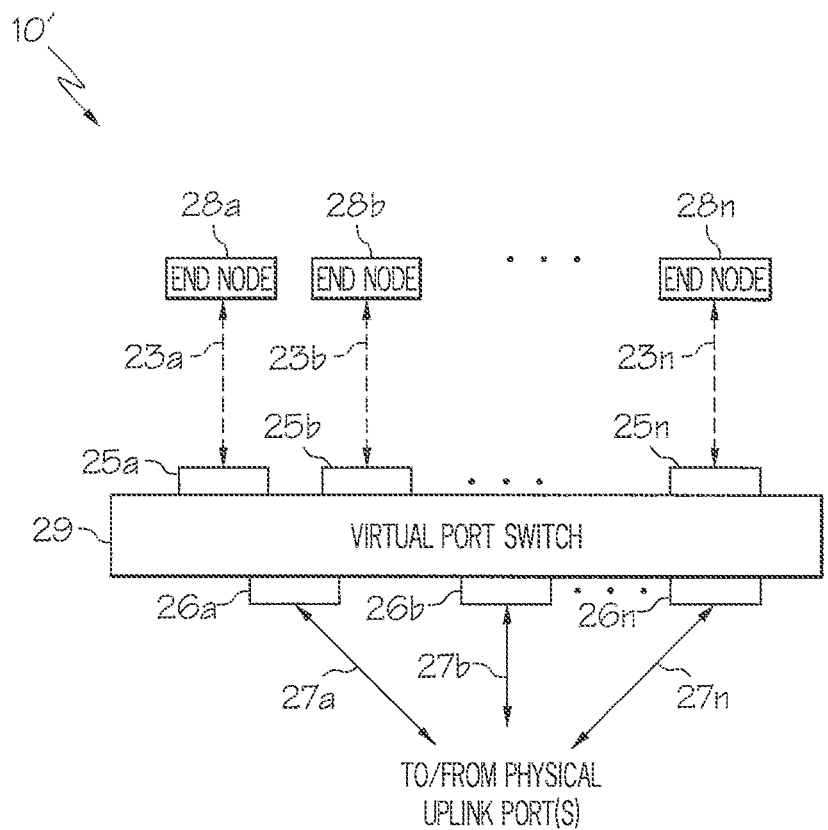
FIG. 2 is a block diagram of a logical representation of the data center from FIG. 1.

With reference now FIG. 2, there is depicted a logical representation of data center 10. As shown, data center 10' includes end-nodes 28a-28n in communication with a v-port switch 29. V-port switch 29 is a network element that can learn of the existence and identities of one or more end-nodes of a physical machine, and can detect, monitors, and controls data packet traffic to and from those end-nodes. In FIG. 2, each of end-nodes 28a-28n is logically connected to a different one of virtual ports (v-ports) 25a-25n of v-port switch 29. Each of v-ports 25a-25n is uniquely assigned to one of end-nodes 28a-28n. For example, v-port 25a is logically connected to end-node 28a via virtual downlink 23a; v-port 25b to end-node 28b via virtual downlink 23b; and v-port 25n to end-node 28n via virtual downlink 23n.

End-nodes 28a-28n are computing or traffic-handling entities operating on physical machines 12a-12n connected to a physical port of v-port switch 19. Such entities can be physical entities, such as a network interface card (NIC), or virtual entities, such as a virtual NIC of a virtual machine.

The generation of a v-port for v-port switch 29 can occur statically through administrator configurations or dynamically (i.e., in real-time) through end-node discovery and automatic v-port assignments. V-port switch 29 uses v-ports 25a-25n in similar fashions to those of physical ports. Because full physical port functionality can be extended to v-ports 25a-25n, each one of v-ports 25a-25n is treated as having at least the same capabilities as a physical port.

The associations of v-ports 25a-25n to end-nodes 23a-23n are one-to-one. Examples of end-node associations of v-ports include, but are not limited to, an association with a virtual NIC or a subset thereof of a virtual machine operating on a physical machine, associations with different queues of a multi-queue NIC or a subset thereof on a physical machine, associations with different network queues or a subset thereof of a CNA, and associations with different types of traffic on a CNA, such as Fibre Channel over Ethernet (FCoE) traffic.

V-port switch 29 also defines uplink v-ports 26a-26n that are logically connected to physical uplink ports 16a-16n (from FIG. 1) by virtual uplinks 27a-27n. Each of virtual uplinks 27a-27n has a one-to-one correspondence with one of uplink v-ports 26a-26n, and connects that uplink v-port to one of physical uplink ports 16a-16n (from FIG. 1). Multiple virtual uplinks 27a-27n, and thus multiple uplink v-ports 26a-26n, can logically connect to the same physical uplink port 16a-16n. Each of downlink v-ports 25a-25n is logically associated with one of uplink v-ports 26a-26n, with more than one of downlink v-ports 25a-25n possibly being associated with any given one of uplink v-port 26a-26n.

When a data packet arrives at v-port switch 29 via one of downlink v-ports 25a-25n, v-port switch 29 switches the data packet to the associated one of uplink v-ports 26a-26n, and from the uplink v-port, switches the data packet to the particular one of physical uplink port 16a-16n to which the uplink v-port is logically connected.

Figure 3:
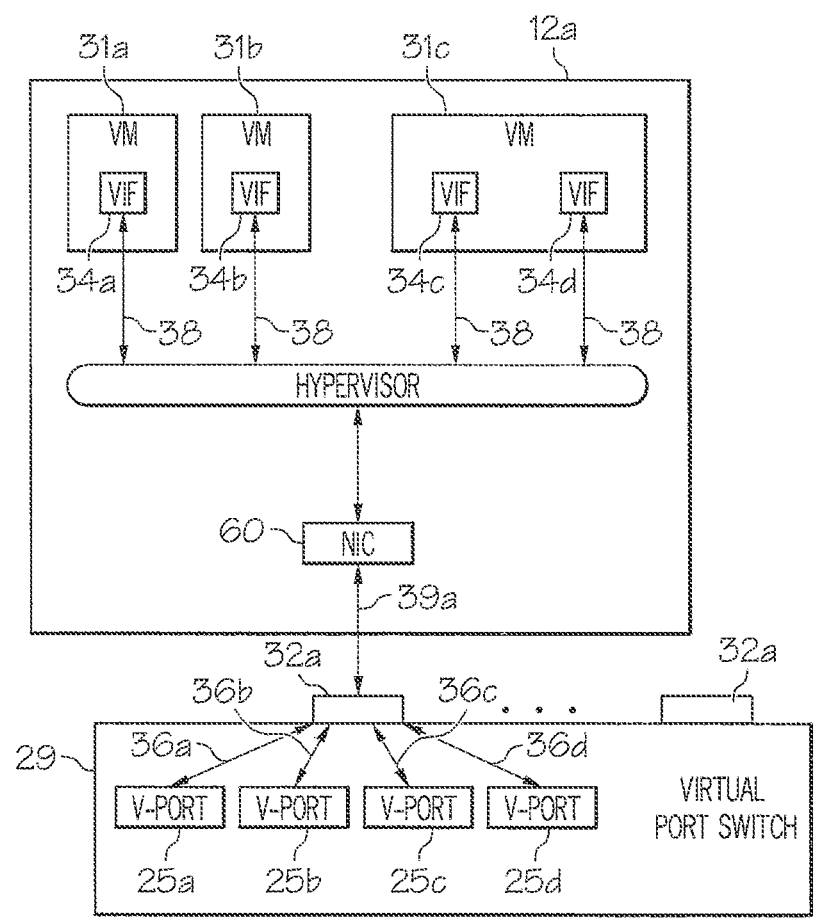
FIG. 3 is a diagram illustrating the relationships between end-nodes and downlink virtual ports from FIG. 2.

Referring now to FIG. 3, there is illustrated the relationships between end-nodes and downlink virtual ports from FIG. 2. As shown, multiple end-nodes operate within virtual machines (VMs) connected to the same physical interface. Physical machine 12a (from FIG. 1) has virtualization software that includes hypervisor 30 for abstracting the hardware of physical machine 12a into one or more VMs 31a, 31b and 31c.

Each one of VMs 31a-31c has one or more associated virtual interfaces (VIF), such as a virtual NIC, with each VIF having its own unique virtual MAC address (vMAC). In FIG. 3, virtual machines 31a, 31b both have one VIF 34a, 34b, respectively, and virtual machine 31c has two VIFs 34c, 34d. In addition, each one of VMs 31a-31c includes at least one software application executing within its own guest operating system. Any type of application can execute on one of VMs 31a-31c.

Each one of VIFs 34a-34d is an example of a virtual end-node. A given one of VIFs 34a-34d can be configured to handle data networking or storage communications. VIFs that process data networking communications are examples of virtual network end-nodes, and VIFs that process storage communications are examples of virtual storage end-nodes.

Hypervisor 30 is in communication with a NIC 60 that handles the I/Os to and from v-port switch 29. Through hypervisor 30, VIFs 34a-34d are logically connected to NIC 60 via virtual links 38.

NIC 60 is connected to a physical port 32a by a physical link 39a. Logically associated with physical port 32a, as signified by virtual links 36a-36d, are four downlink v-ports 25a-25d. Each one of downlink v-ports 25a-25d is uniquely assigned to one of virtual end-nodes VIF 34a-34d. For example, v-port 25a can be assigned to VIF 34a; v-port 25b to VIF 34b; v-port 25c to VIF 34c; and v-port 25d to VIF 34d. These four downlink v-ports 25a-25d can also be considered logically associated with physical link 39a; that is, each one of downlink v-ports 25a-25d is a subdivided part of physical link 39a.

Figure 4:
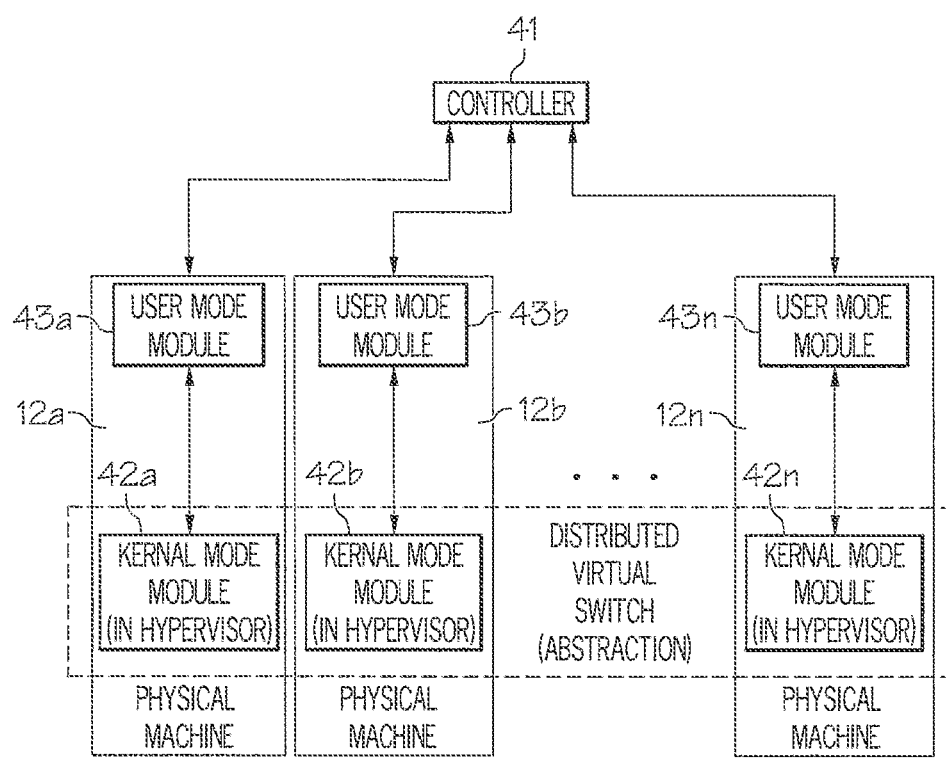
FIG. 4 is a block diagram of an overall architecture of location independent dynamic port mirroring on distributed virtual switches, in accordance with a preferred embodiment of the present invention.

With reference now to FIG. 4, there is illustrated a block diagram of an overall architecture of location independent dynamic port mirroring on distributed virtual switches, in accordance with a preferred embodiment of the present invention. In order to implement the port mirroring feature where a source port and a monitor port are located on separate physical machines, the solution needs to include other components that are part of the distributed virtual switch (DVS) solution. For example, a central controller 41 is needed for a network administrator to configure the DVS and port settings. There is a one-to-one mapping between a DVS and a controller. In addition, kernel-mode modules 42a-42n are included in corresponding physical machines 12a-12n for handling packet forwarding. Also, user-mode modules 43a-43n can be optionally included in corresponding physical machines 12a-12n for handling some control plane protocols.

Each one of kernel-mode modules 42a-42n and each one of user-mode module 43a-43n interact with one another using operation system specific mechanisms. On the other hand, each one of user-mode modules 43a-43n communicates with controller 41 via sockets. The present invention utilizes the communication paths among kernel-mode modules 42a-42n, user-mode modules 43a-43n and controller 41 to encapsulate and to send data packets from a kernel-mode module on one of physical machines 12a-12n to a kernel-mode module on a different one of physical machines 12a-12n.

The multiplexing of the (mirrored) data packet destination is performed by controller 41. To accomplish this, controller 41 must be able to know the (socket) location of the user-mode module at each physical machine, and the user-mode module at the source port (end of the port mirror) must encapsulate sufficient information in the encapsulated data packets so that controller 41 can decide which one of physical machines 12a-12n the encapsulated packet should be directed to.

In order for a VM to come alive on a v-port, the v-port needs to report to controller 41 initially. For example, in FIG. 3, VIF 34a is connected to hypervisor 30 on physical machine 12a, and VM 31a becomes alive on physical machine 12a after VIF 34a sends a message to a controller (not shown). In turn, the controller records the location of VIF 34a in its database. A VIF can be alive on only one physical machine at any given time. If the VIF moves to a different physical machine during migration, the VIF will have to disconnect from the current physical machine before coming alive on the different physical machine. For example, after VIF 34a has been disconnected from hypervisor 30 on physical machine 12a, VIF 34a sends a message to the controller, and VM 31a is not alive on physical machine 12a anymore. The controller then removes the location of VIF 34a from its database.

A user can assign and configures a monitor port of a (mirrored) port on a distributed switch by using a management tool. For example, one of VIFs 34a-34d can be a monitor port.

Figure 5:
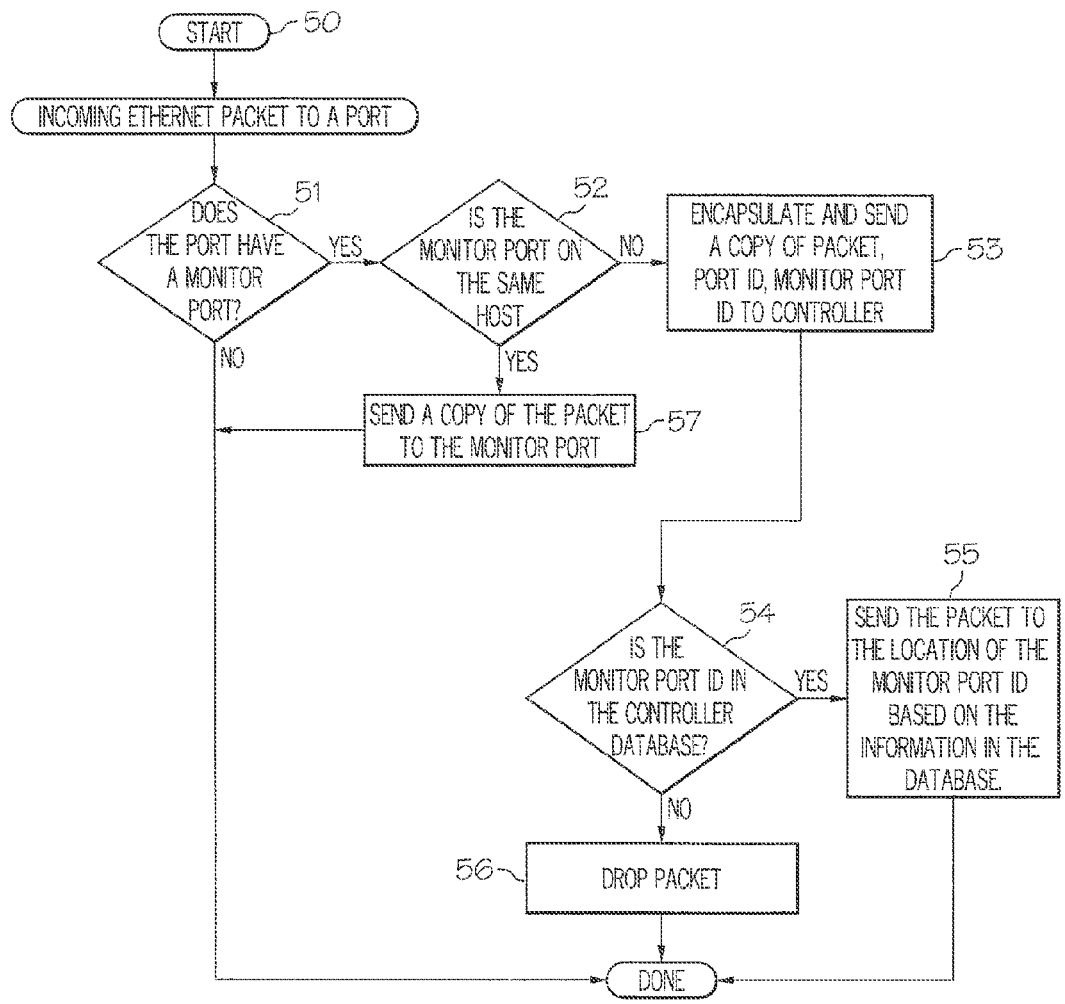
FIG. 5 is a high-level logic flow diagram of a method for providing location independent dynamic port mirroring on distributed virtual switches, in accordance with a preferred embodiment of the present invention.

Referring now to FIG. 5, there is depicted a high-level logic flow diagram of a method for handling local port mirroring on distributed virtual switches, in accordance with a preferred embodiment of the present invention. Starting at block 50, in response to an incoming data packet arriving at a port (e.g., VIF 34a) of a physical machine (e.g., physical machine 12a), a determination is made whether or not the port has a monitor port, as shown in block 51.

If the port has a monitor port (e.g., monitor port VIF 34a'), another determination is made whether or not the monitor port is located on the same physical machine (e.g., physical machine 12a), as depicted in block 52. If the monitor port is not located on the same physical machine, then a copy of the data packet, the source port ID (i.e., port ID of VIF 34a) and the monitor port ID (i.e., port ID of VIF 34a') are encapsulated and sent to the controller (e.g., controller 41), as shown in block 53. The controller then determines whether or not the monitor port ID is stored in its database, as depicted in block 54. If the monitor port ID is stored in the controller database, then the controller sends the data packet to the location of the monitor port ID based on the information stored in the controller database, as shown in block 55. Otherwise, if the monitor port ID is not stored in the controller database, the data packet is dropped, as depicted in block 56.

Otherwise, if the monitor port is located on the same physical machine, then a full copy of the incoming data packet is sent to the monitor port (i.e., monitor port VIF 34a'), as shown in block 57.

As has been described, the present disclosure provides a method for providing location independent dynamic port mirroring on distributed virtual switches.

It is also important to note that although the present invention has been described in the context of a fully functional computer system, those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. A method for providing location independent dynamic port mirroring, said method comprising:
   providing a controller for configuring one or more virtual switches within a plurality of physical machines to appear as a set of distributed virtual switches;
   in response to a receipt of a data packet at a port of a first one of said physical machines, determining whether or not said port has a mirrored port located on said first one physical machine;
   in a determination that said port has a mirrored port located on said first one physical machine, sending a copy of said data packet to said mirrored port located on said first one physical machine; and
   in a determination that said port has a mirrored port located on a second one of said physical machines, encapsulating a copy of said data packet along with an identification (ID) of said port and an ID of said mirrored port located on said second one physical machine, and sending said encapsulated information to said controller; and
   wherein said method further includes determining by said controller whether or not said mirrored port ID is stored in a database within said controller;
   in a determination that said mirrored port ID is stored in a database within said controller, sending said data packet to said mirrored port according to said monitor mirrored port ID stored in said database within said controller; and
   in a determination that said mirrored port ID is not stored in a database within said controller, discarding said data packet.

2. The method of claim 1, wherein said virtual switches are contained within a hypervisor of each of said physical machines.

3. The method of claim 2, wherein said controller communicates with each of said physical machines via a communication module within a hypervisor of each of said physical machines.

* * * * *